US010538142B2

(12) United States Patent
Won et al.

(10) Patent No.: US 10,538,142 B2
(45) Date of Patent: Jan. 21, 2020

(54) AIR CONDITIONER FOR VEHICLE

(71) Applicant: HANON SYSTEMS, Daejeon (KR)

(72) Inventors: Seung Sik Won, Daejeon (KR); Seok Kim, Daejeon (KR); Yong Sik Kim, Daejeon (KR); Boo Yong Um, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 1 day.

(21) Appl. No.: 15/768,076

(22) PCT Filed: Apr. 20, 2017

(86) PCT No.: PCT/KR2017/004223
§ 371 (c)(1),
(2) Date: Apr. 13, 2018

(87) PCT Pub. No.: WO2017/183918
PCT Pub. Date: Oct. 26, 2017

(65) Prior Publication Data
US 2018/0312030 A1   Nov. 1, 2018

(30) Foreign Application Priority Data

Apr. 22, 2016   (KR) .................... 10-2016-0049514
Apr. 20, 2017   (KR) .................... 10-2017-0050892

(51) Int. Cl.
*B60H 1/00*   (2006.01)
(52) U.S. Cl.
CPC ..... *B60H 1/00685* (2013.01); *B60H 1/00842* (2013.01); *B60H 1/00064* (2013.01)

(58) Field of Classification Search
CPC ........... B60H 1/00842; B60H 1/00864; B60H 1/00835; B60H 1/00685; B60H 1/00678;
(Continued)

(56) References Cited

U.S. PATENT DOCUMENTS 6,048,263 A * 4/2000 Uchida .............. B60H 1/00064
165/204
2004/0152410 A1 * 8/2004 Seki ................... B60H 1/00685
454/139

(Continued)

FOREIGN PATENT DOCUMENTS

EP   0979744 A1 *   2/2000   ......... B60H 1/00842
EP   1514708 A1 *   3/2005   ......... B60H 1/00071
(Continued)

OTHER PUBLICATIONS

International Search Report and Written Opinion dated Jul. 25, 2017 from International Patent Application Serial No. PCT/KR2017/004223, with English translation of International Search Report.

*Primary Examiner* — Tho V Duong
(74) *Attorney, Agent, or Firm* — Dickinson Wright PLLC

(57) ABSTRACT

The present invention relates to an air conditioner for a vehicle, which includes a dome-type temperature-adjusting door and a dome-type face door rotatably mounted in a mixing chamber of an air-conditioning case, such that a curved surface of the inner face of the temperature-adjusting door and a curved surface of the inner face of the face door can smoothly guide air toward vents according to air discharge modes so as to reduce flow resistance and increase air volume.

9 Claims, 13 Drawing Sheets

(58) Field of Classification Search
CPC ............ B60H 1/00664; B60H 1/00671; B60H 2001/00707
See application file for complete search history.

(56) References Cited

U.S. PATENT DOCUMENTS

| | | | |
|---|---|---|---|
| 2006/0060342 A1 | 3/2006 | Yamamoto | |
| 2007/0204985 A1* | 9/2007 | Fukagawa | B60H 1/00685 165/203 |
| 2008/0108293 A1* | 5/2008 | Haupt | B60H 1/00685 454/156 |
| 2016/0305676 A1* | 10/2016 | Wang | F24F 7/08 |
| 2017/0282686 A1* | 10/2017 | Wisniewski | B60H 1/00842 |

FOREIGN PATENT DOCUMENTS

| | | |
|---|---|---|
| KR | 20090064821 A | 6/2009 |
| KR | 20090090036 A | 8/2009 |
| KR | 20100078166 A | 7/2010 |
| KR | 20100086260 A | 7/2010 |

\* cited by examiner

PRIOR ART

PRIOR ART

US 10,538,142 B2

AIR CONDITIONER FOR VEHICLE

CROSS-REFERENCE TO RELATED APPLICATIONS

This application is a U.S. National Stage of International Application No. PCT/KR2017/004223, Apr. 20, 2017, which claims the benefit and priority of KR 10-2016-0049514 filed Apr. 22, 2016 and KR 10-2017-0050892 filed Apr. 20, 2017. The entire disclosures of each of the above application are incorporated herein by reference.

TECHNICAL FIELD

The present invention relates to an air conditioner for a vehicle, and more particularly, to an air conditioner for a vehicle which includes a dome-type temperature-adjusting door and a dome-type face door rotatably mounted in a mixing chamber of an air-conditioning case.

BACKGROUND ART

In general, an air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the indoor air or the outdoor air into the air conditioner, heating or cooling the introduced air, and blowing the heated or cooled air into the vehicle.

According to mounted structures of an air blower unit, an evaporator unit and a heater core unit, such an air conditioner is classified into a three-piece type air conditioner where the air blower unit, the evaporator unit, and the heater core unit are disposed independently, a semi-center type air conditioner where the evaporator unit and the heater core unit are embedded in an air-conditioning case and the air blower unit is mounted separately, and a center-mounting type air conditioner where the three units are all embedded in the air-conditioning case.

Recently, an independent type air conditioner, which separately and independently provides air of different temperatures to a driver's seat and to a passenger's seat inside the vehicle to thereby individually heat and cool the seats according to the driver's or the passenger's need, has been disclosed.

FIG. 1 is a sectional view of a conventional air conditioner for a vehicle, and FIG. 2 is a perspective view of the conventional air conditioner for the vehicle. As shown in the drawings, the air conditioner 1 includes: an air-conditioning case 10 having an air inflow port 11 formed at an inlet thereof, and a defrost vent 12, a face vent 13 and floor vents 14 and 15 formed at an outlet thereof in such a way as to be adjusted in degree of opening by mode doors 16a, 16b and 16c; an evaporator 2 and a heater core 3 that are mounted on air passageways in the air-conditioning case 10 in order and spaced apart from each other at a predetermined interval; and an air blower (not shown) connected to the air inflow port 11 of the air-conditioning case 10 for sending indoor air or outdoor air.

The evaporator 2 and the heater core 3 are mounted inside the air-conditioning case 10 almost vertically.

Moreover, the air conditioner further includes a temperature-adjusting door 18 mounted between the evaporator 2 and the heater core 3 for controlling temperature by adjusting the degree of opening of a cold air passageway P1 bypassing the heater core 3 and of a warm air passageway P2 passing through the heater core 3.

Furthermore, the mode doors 16a, 16b and 16c control the degree of opening of the relevant vents to carry out various air discharge modes, namely, a vent mode, a bi-level mode, a floor mode, a mixing mode, and a defrost mode.

Additionally, a partition wall 17 is formed between the warm air passageway P2 located at the rear side of the heater core 3 and the floor vents 14 and 15 to partition the warm air passageway P2 from the floor vents 14 and 15. Here, the floor vents 14 and 15 are divided into the floor vent 14 for a front seat and the floor vent 15 for a rear seat.

In addition, because there is a severe difference in temperature between the front seat and the rear seat, in order to solve the problem, a console duct 20 for supplying air-conditioning air to the rear seat space by inducing discharge of air toward a console box (not shown), which is the central portion of the interior of the vehicle, is formed at the rear side of the floor vents 14 and 15 of the air-conditioning case 10.

An inlet of the console duct 20 is connected with the face vent 13 to communicate with the face vent 13, and guides some of the air passing through the face vent 13 toward the console box and supplies the air to the rear seat space to heat and cool the rear seat space.

In the meantime, a through hole 25 is formed at one side of the face vent 13 so that some of the air passing through the face vent 13 is supplied to the console duct 20.

Therefore, some of the air passing through the face vent 13 is discharged to the rear seat space of the vehicle after being supplied to the console duct 20 through the through hole 25.

As described above, in the air conditioner 1 for the vehicle, in case of the greatest cooling mode, the temperature-adjusting door 18 opens the cold air passageway P1 and closes the warm air passageway P2. Therefore, the air blown by the air blower (not shown) exchanges heat with refrigerant flowing inside the evaporator 2 while passing through the evaporator 2, and is converted into cold air. After that, the converted air flows toward a mixing chamber MC through the cold air passageway P1, and then, is discharged to the interior of the vehicle through the vents opened by the mode doors 16a, 16b and 16c according to the predetermined air discharge modes, namely, the vent mode, the bi-level mode, the floor mode, the mixing mode and the defrost mode, so as to cool the interior of the vehicle.

Moreover, in the case of the greatest heating mode, the temperature-adjusting door 18 closes the cold air passageway P1 and opens the warm air passageway P2. Accordingly, the air blown by the air blower (not shown) passes through the evaporator 2, and then, is converted into warm air by exchanging heat with cooling water flowing inside the heater core 3 while passing through the heater core 3 through the warm air passageway P2. After that, the converted air flows toward the mixing chamber MC, and then, is discharged to the interior of the vehicle through the vents opened by the mode doors 16a, 16b and 16c according to the predetermined air discharge modes, so as to heat the interior of the vehicle.

Meanwhile, in the vent mode and the bi-level mode that the face vent 13 is opened, out of the air discharge modes, some of the air passing through the face vent 13 is supplied to the console duct 20, and then, is discharged to the rear side of the console box inside the vehicle in order to cool and heat the rear seat space.

However, because the temperature-adjusting door 18 and the mode doors 16a, 16b and 16c of the conventional air conditioner 1 are all flat-type doors, the conventional air conditioner 1 cannot smoothly guide the air flowing toward the vents in various directions according to the air discharge modes, and it increases flow resistance of air and reduces air volume.

Furthermore, the conventional air conditioner has another disadvantage in that a door actuating force is increased by a torque generated because the flow direction of the air is perpendicular to the temperature-adjusting door 18 and the mode doors 16a, 16b and 16c.

DISCLOSURE

Technical Problem

Accordingly, the present invention has been made in an effort to solve the above-mentioned problems occurring in the prior arts, and it is an object of the present invention to provide an air conditioner for a vehicle, which includes a dome-type temperature-adjusting door and a dome-type face door rotatably mounted in a mixing chamber of an air-conditioning case, such that a curved surface of the inner face of the temperature-adjusting door and a curved surface of the inner face of the face door can smoothly guide air toward vents according to air discharge modes so as to reduce flow resistance and increase air volume. It is another object of the present invention to provide an air conditioner for a vehicle, which a rotational direction of the face door is deviated from an air flow direction so as to reduce an actuating force of the face door.

Technical Solution

To achieve the above objects, the present invention provides an air conditioner for a vehicle including: an air-conditioning case having a defrost vent, a face vent, and floor vents to discharge air to the interior of the vehicle, and a cold air passageway and a warm air passageway formed therein; a defrost door for adjusting the degree of opening of the defrost vent, a face door for adjusting the degree of opening of the face vent, and a floor door for adjusting the degree of opening of the floor vents, the defrost door, the face door and the floor door being mounted inside the air-conditioning case; and a temperature-adjusting door mounted inside the air-conditioning case to adjust the degree of opening of the cold air passageway and the warm air passageway, wherein the temperature-adjusting door is rotatably mounted in a mixing chamber where the cold air passageway and the warm air passageway meet together and is a dome-type door for adjusting the degree of opening of the cold air passageway and the warm air passageway relative to the mixing chamber, and the face door is rotatably mounted in the mixing chamber and is a dome-type door for adjusting the degree of opening of the face vent relative to the mixing chamber.

Advantageous Effects

The air conditioner for the vehicle according to an embodiment of the present invention includes a dome-type temperature-adjusting door and a dome-type face door rotatably mounted in a mixing chamber of an air-conditioning case, such that a curved surface of the inner face of the temperature-adjusting door and a curved surface of the inner face of the face door can smoothly guide air toward vents according to air discharge modes so as to reduce flow resistance and increase air volume.

Additionally, because the face door is mounted in such a way that a rotational direction of the face door is deviated from a flow direction of the air flowing toward the face vent, the air conditioner can reduce an actuating force of the face door.

MODE FOR INVENTION

Figure 1:
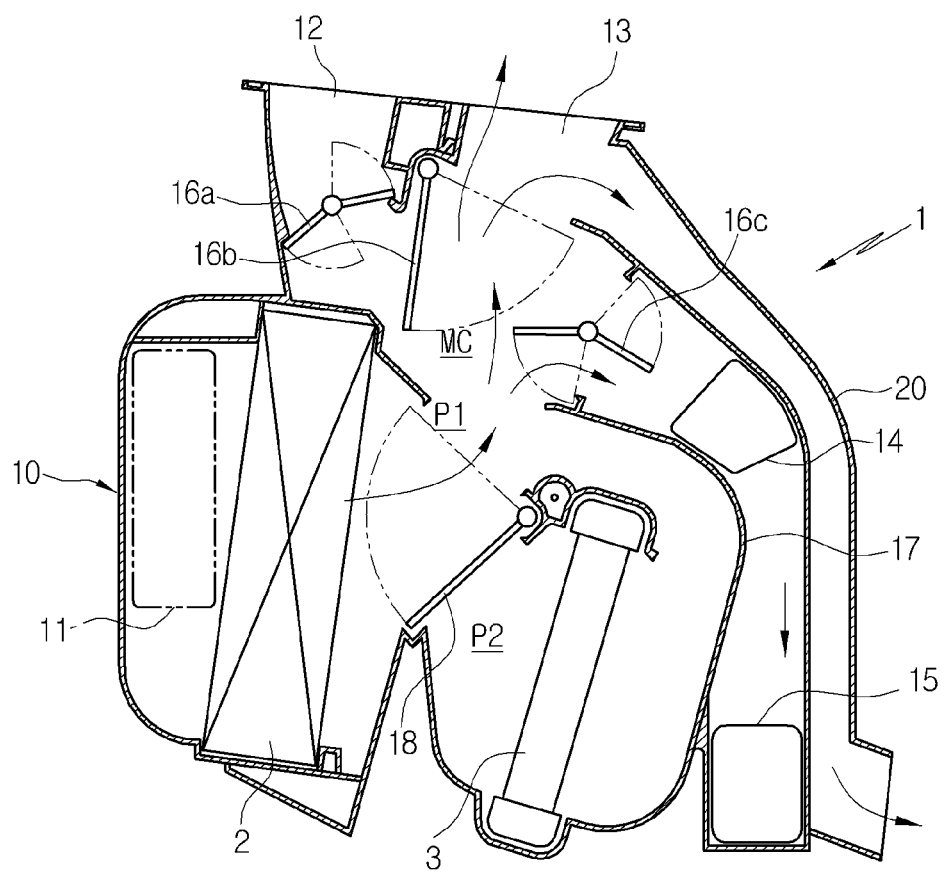
FIG. 1 is a sectional view showing a conventional air conditioner for a vehicle.
Figure 2:
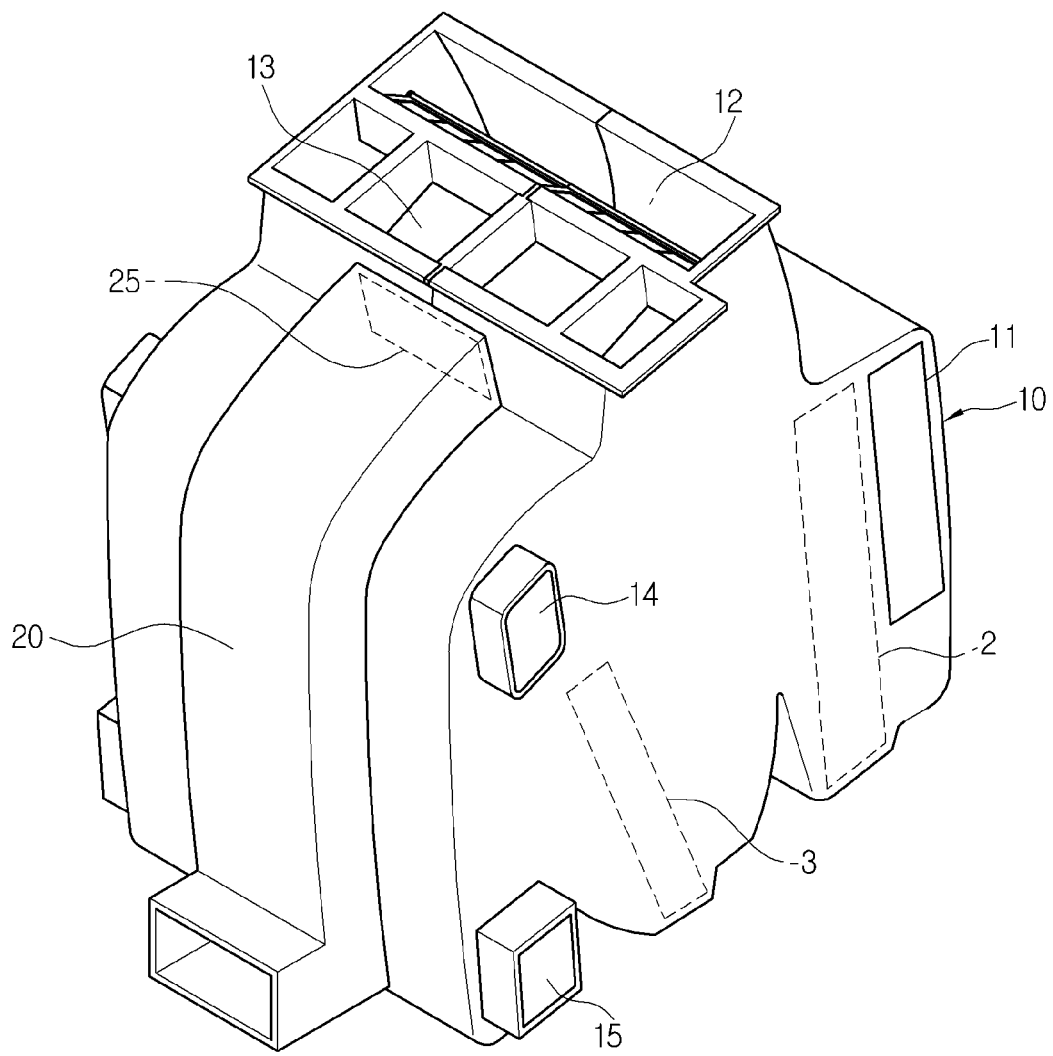
FIG. 2 is a perspective view showing the conventional air conditioner for the vehicle.

Hereinafter, with reference to the attached drawings, technical structure and configuration of an air conditioner for a vehicle according to a preferred embodiment of the present invention will be described in detail.

As showing in the drawings, an air conditioner 100 for a vehicle according to a preferred embodiment of the present invention includes: an air-conditioning case 110 having an air inflow port 111 formed on one side thereof, a plurality of air outflow ports formed on the other side, and an cold air passageway P1 and a warm air passageway P2 formed in an air passageway formed therein; an evaporator 101 and a heater core 102 spaced apart from each other at a predetermined interval in the air passageway inside the air-conditioning case 110; and a temperature-adjusting door 120 mounted between the evaporator 101 and the heater core 102 for adjusting the degree of opening of the cold air passageway P1, which bypasses the heater core 102, and the degree of opening of the warm air passageway P2, which passes through the heater core 102.

Moreover, an air blower (not shown) for blowing indoor air or outdoor air is mounted at the air inflow port 111 of the air-conditioning case 110.

The air-conditioning case 110 may be formed by a left case 110*a* and a right case 110*b* assembled with each other or by left and right cases 110*a* and 110*b* and a lower case assembled to lower portions of the left and right cases 110*a* and 110*b*.

Furthermore, the evaporator 101 is mounted at the upstream side of the cold air passageway P1 of the air-conditioning case 110, and the heater core 102 is mounted on the warm air passageway P2 of the air-conditioning case 110.

In this instance, the evaporator 101 is mounted to stand on the cold air passageway P1 at a predetermined angle, and the heater core 102 is mounted to lie on the warm air passageway P2 at a predetermined angle.

That is, the evaporator 101 is perpendicularly arranged on the cold air passageway P1, preferably, is arranged to be inclined at a predetermined angle from verticality, and the heater core 102 is horizontally arranged, preferably, is arranged to be inclined at a predetermined angle from horizontality.

Here, horizontality is the back-and-forth direction of the vehicle, and verticality is at right angles to the back-and-forth direction of the vehicle.

In other words, the evaporator 101 is arranged such that air introduced into the cold air passageway P1 passes the evaporator 101 in the horizontal direction, namely, in the back-and-forth direction of the vehicle.

The heater core 102 is arranged such that air introduced into the warm air passageway P2 passes the heater core 102 in the vertical direction, namely, at right angles to the back-and-forth direction of the vehicle.

Additionally, the heater core 102 includes a pair of header tanks spaced apart from each other, a plurality of tubes for connecting the header tanks with each other, and radiation fins mounted between the plural tubes.

In the meantime, the warm air passageway P2 is branched from the cold air passageway P1 at the rear of the evaporator 101, and then, meets the cold air passageway P1 after passing through the heater core 102.

Moreover, a mixing chamber MC where cold air and warm air are mixed is formed at an area where the cold air passageway P1 and the warm air passageway P2 meet together. That is, the mixing chamber MC is formed at an outlet of the cold air passageway P1 and an outlet of the warm air passageway P2.

Furthermore, the air outflow ports formed at the outlet of the air-conditioning case 110 are a defrost vent 112 for discharging air toward the front window of the vehicle, a face vent 113 for discharging air toward the face of a passenger sitting on the front seat, and floor vents 114 and 115 for discharging air toward the passenger's feet.

Additionally, the floor vents 114 and 115 are divided into the floor vent 114 for the front seat to discharge air toward the feet of the passenger sitting on the front seat, and the floor vent 115 for the rear seat to discharge air toward the feet of a passenger sitting on the rear seat.

In addition, the defrost vent 112, the face vent 113 and the floor vents 114 and 15 are respectively opened and closed by a defrost door 130, a face door 140 and a floor door 150, which are mode doors mounted at the corresponding vents, in order to adjust the degree of opening of the doors.

Here, the defrost door 130 and the floor door 150 are flat-type doors. In this instance, the floor door 150 is a center pivot type door, which has plates at both sides around a rotary shaft, out of the flat type doors.

Moreover, the face door 140 is a dome-type door which is rotatably mounted in the mixing chamber MC to adjust the degree of opening of the face vent 113 relative to the mixing chamber MC.

That is, a rotary shaft 141 of the face door 140 is rotatably mounted in the mixing chamber MC, such that the dome-type face door 140 rotates on the rotary shaft 141 mounted in the mixing chamber MC to adjust the degree of opening of the face vent 113.

In the meantime, the dome-type doors like the face door 140 and the temperature-adjusting door 120 are formed in a dome shape that plates spaced apart from the rotary shafts 121 and 141 in a radial direction are curved.

The floor vent 114 for the front seat has right and left floor vents 114*a* and 114*b* for discharging air to the left side (driver's seat) and the right side (passenger's seat) inside the vehicle. That is, the left floor vent 114*a* is formed at the left case 110*a* of the air-conditioning case 110, and the right floor vent 114*b* is formed at the right case 110*b*.

Furthermore, the air-conditioning case 110 includes a floor passageway 116 formed therein to guide the air inside the air-conditioning case 110 to the right and left floor vents 114*a* and 114*b*.

Figure 3:
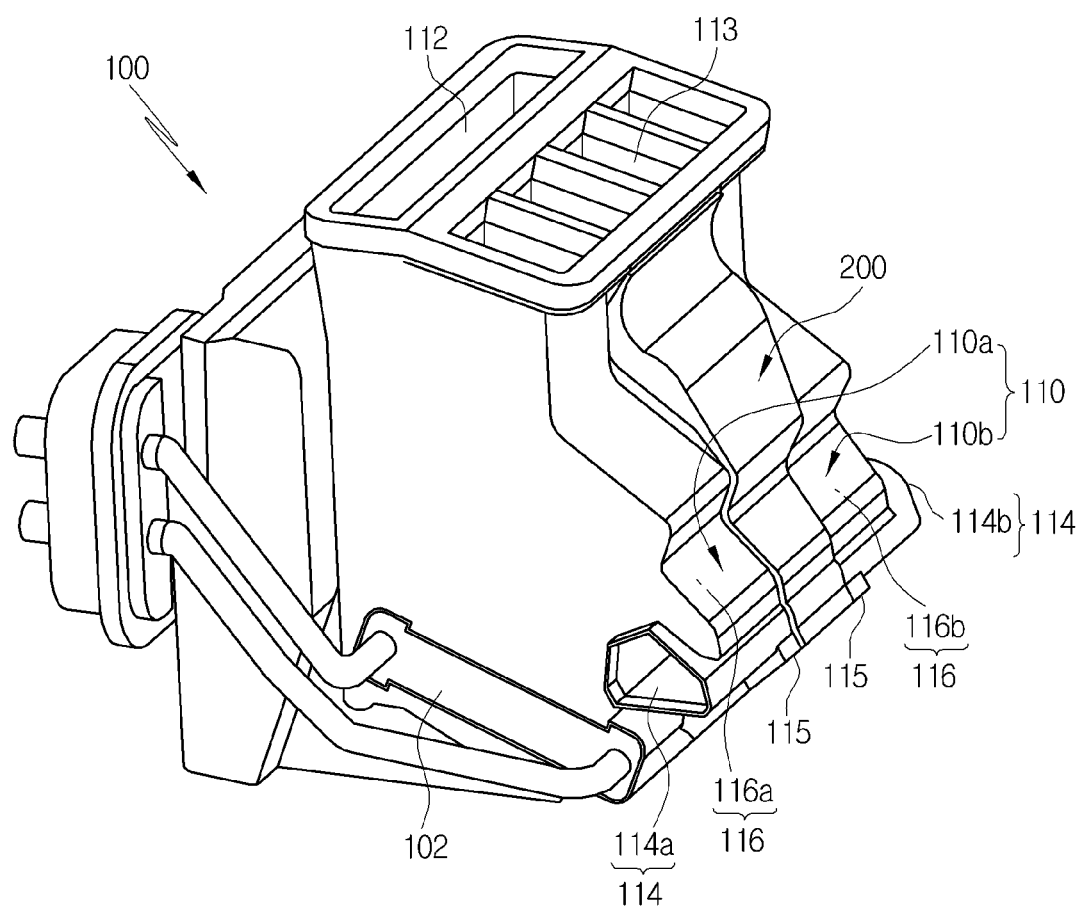
FIG. 3 is a perspective view showing an air conditioner for a vehicle according to a preferred embodiment of the present invention.

The floor passageway 116 includes left and right floor passageways 116*a* and 116*b*, which are spaced apart from each other in the width direction of the vehicle inside the air-conditioning case 110 and are formed at positions respectively corresponding to the left and right floor vents 114*a* and 114*b*. In FIG. 3, the reference numeral 116*a* is the left floor passageway formed in the left case 110*a*, and the reference numeral 116*b* is the right floor passageway formed in the right case 110*b*.

In other words, the left floor passageway 116*a* formed in the left case 110*a* guides the air in the air-conditioning case 110 to the left floor vent 114*a* for the front seat and the left floor vent 115 for the rear seat, and the right floor passageway 116*b* formed in the right case 110*b* guides the air in the air-conditioning case 110 to the right floor vent 114*b* for the front seat and the right floor vent 115 for the rear seat.

Additionally, the floor passageway 116 is formed at the rear of the warm air passageway P2 inside the air-conditioning case 110, and a partition wall 117 is disposed between the warm air passageway P2 and the floor passageway 116 to partition the warm air passageway P2 from the floor passageway 116.

In addition, the floor passageway 116 connects the mixing chamber MC and the floor vents 114 and 115 with each other inside the air-conditioning case 110.

Meanwhile, the floor door 150 is mounted at an inlet of the floor passageway 116 to open and close the floor passageway 116 and the floor vents 114 and 115.

Moreover, the temperature-adjusting door 120 is rotatably mounted in the mixing chamber MC where the cold air passageway P1 and the warm air passageway P2 meet together, and is a dome-type door to adjust the degree of opening of the cold air passageway P1 and the warm air passageway P2 relative to the mixing chamber MC.

In this instance, the rotary shaft 121 of the temperature-adjusting door 120 is rotatably mounted in the mixing chamber MC. Therefore, the dome-type temperature-adjusting door 120 adjusts the degree of opening of the outlet of the cold air passageway P1 and the outlet of the warm air passageway P2 while rotating on the rotary shaft 121 mounted in the mixing chamber MC so as to adjust temperature by controlling a mixed amount of cold air and warm air.

Furthermore, the temperature-adjusting door 120 and the face door 140 are mounted in opposite directions in the mixing chamber MC.

That is, the temperature-adjusting door 120 is mounted toward the outlets of the cold air passageway P1 and the warm air passageway P2, namely, in the downward direction from the rotary shaft 121 mounted in the mixing chamber MC, and the face door 140 is mounted toward the face vent 113, namely, in the upward direction from the rotary shaft 141 mounted in the mixing chamber MC.

In this instance, the rotary shaft 121 of the temperature-adjusting door 120 and the rotary shaft 141 of the face door 140 are arranged on the same line in the vertical direction and are spaced apart from each other at a predetermined interval.

Additionally, an inner face of the temperature-adjusting door 120 has a curved surface 122 to guide an air flow, and an inner face of the face door 140 also has a curved surface 142 to guide an air flow.

Figure 5:
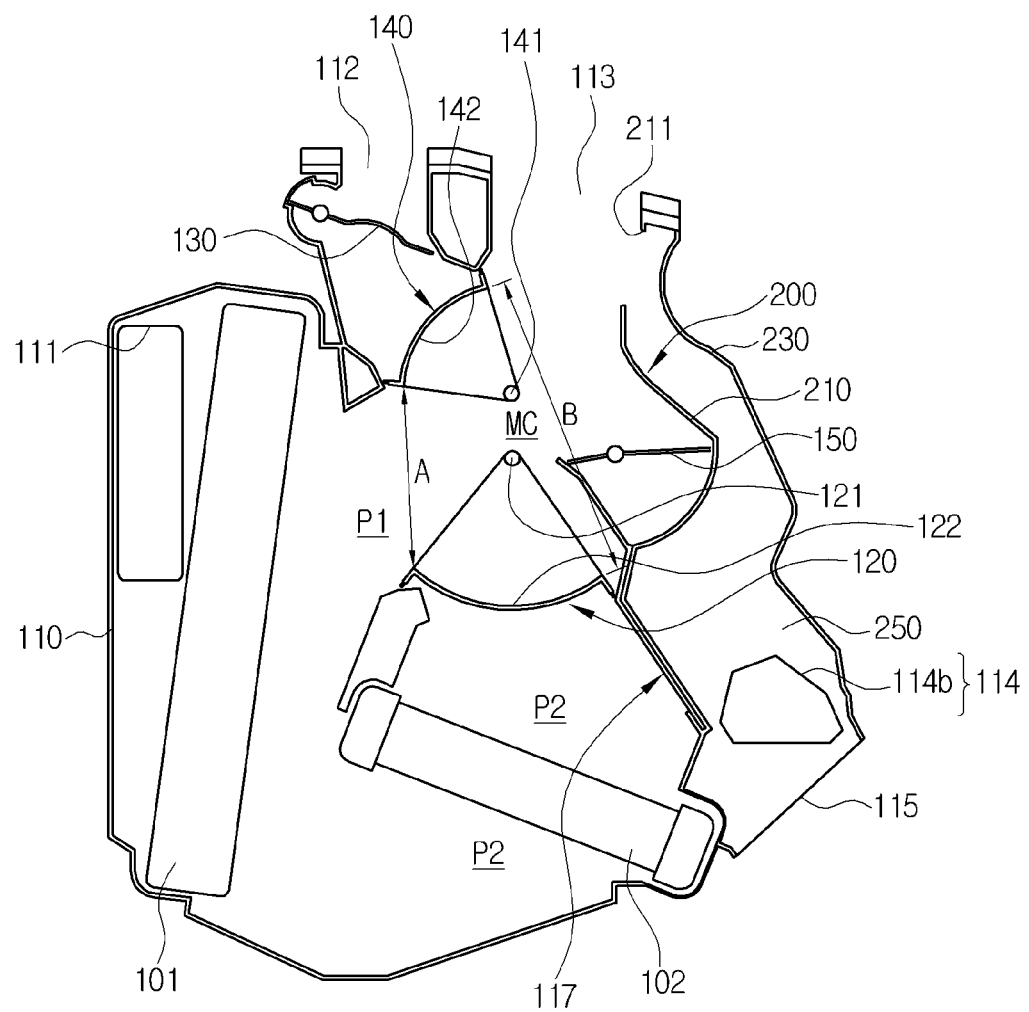
FIG. 5 is a sectional view showing the console duct of the air conditioner for the vehicle according to the preferred embodiment of the present invention in a vent mode.
Figure 6:
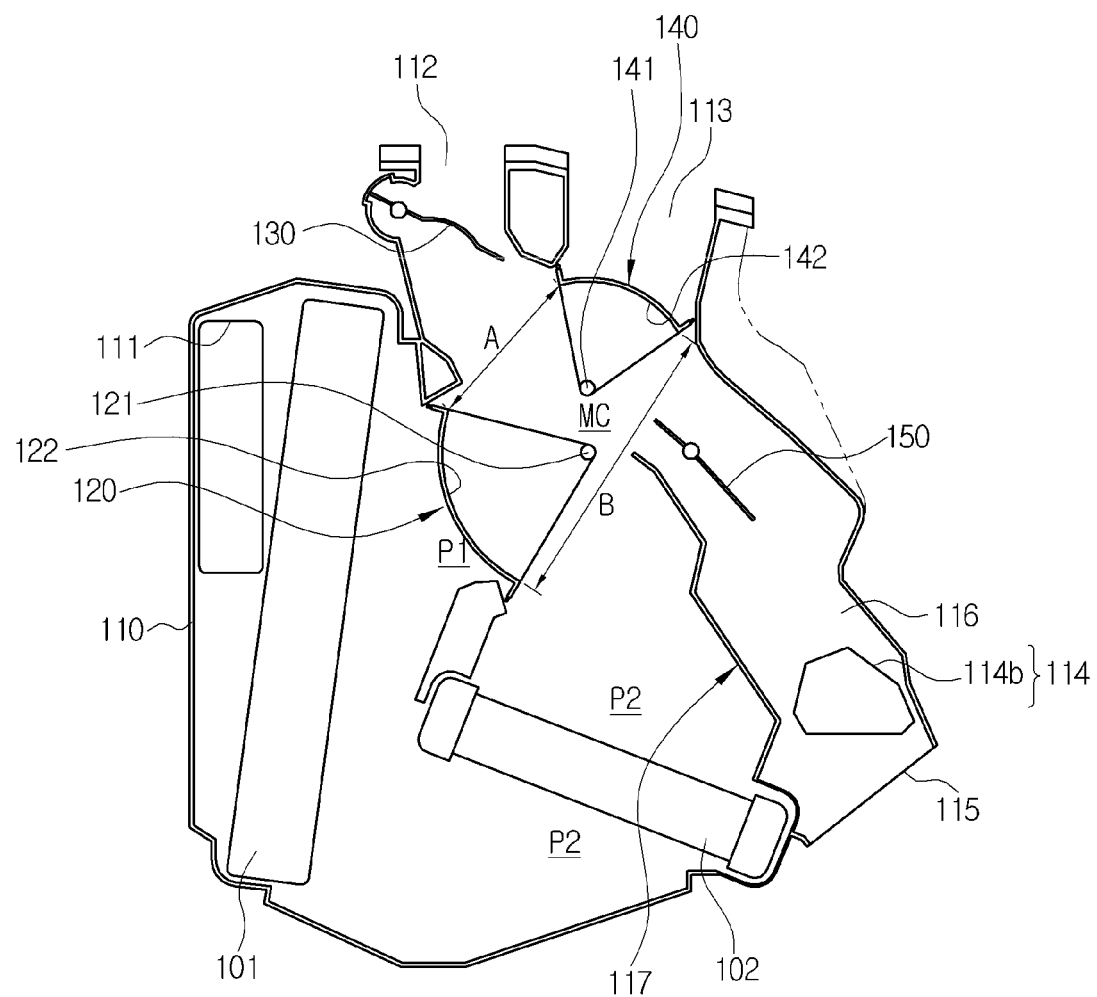
FIG. 6 is a sectional view showing a floor passageway of the air conditioner for the vehicle according to the preferred embodiment of the present invention in a floor mode.

In this instance, as shown in FIGS. 5 and 6, if an interval between one end portion of the temperature-adjusting door 120 in the rotational direction and one end portion of the face door 140 in the rotational direction is A and an interval between the other end portion of the temperature-adjusting door 120 in the rotational direction and the other end portion of the face door 140 in the rotational direction is B, A is smaller than B in all air discharge modes.

Here, one end portion of the temperature-adjusting door 120 and one end portion of the face door 140 are located near to the evaporator 101.

Figure 7:
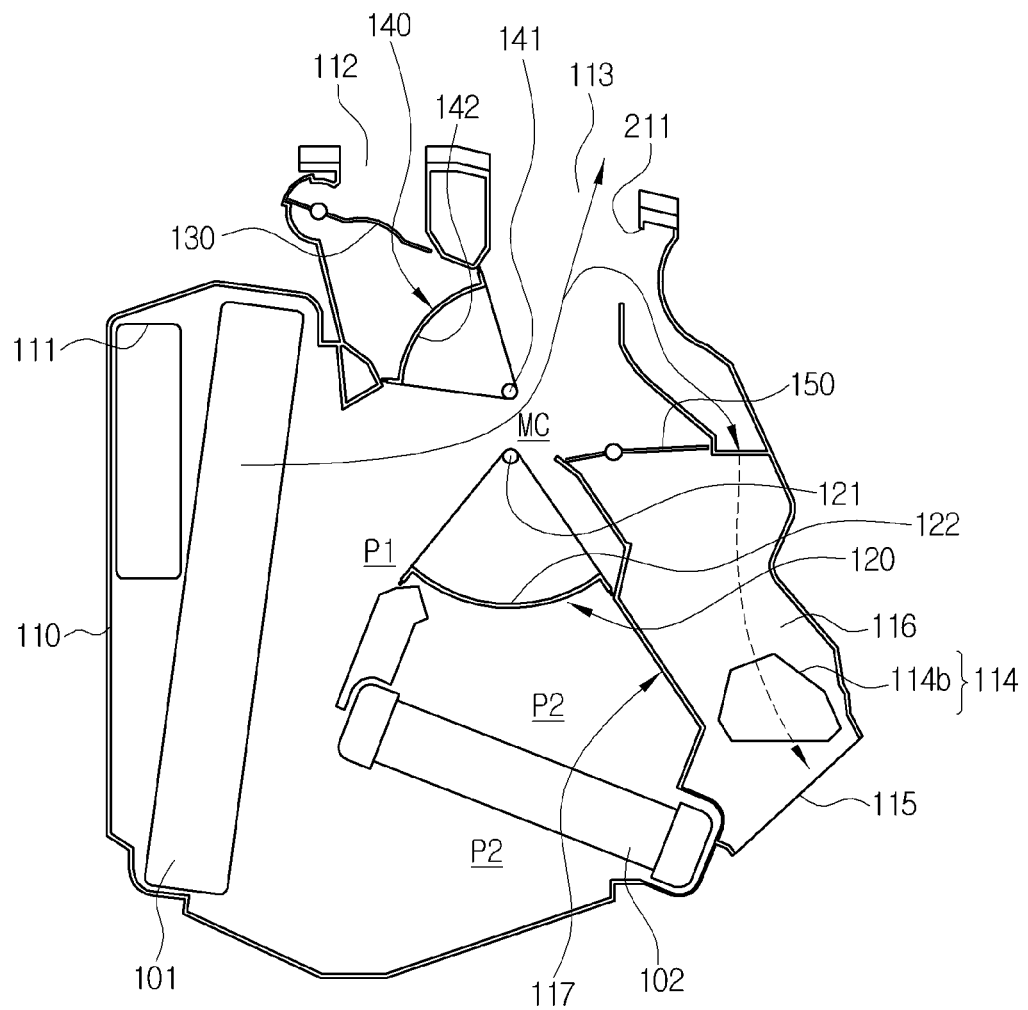
FIG. 7 is a sectional view showing the vent mode of the air conditioner for the vehicle according to the preferred embodiment of the present invention.

Therefore, in a vent mode shown in FIG. 7, the curved surface 122 of the inner face of the temperature-adjusting door 120 guides the air of the mixing chamber MC passing through the evaporator 101 to the air outflow port located at the upper part, namely, to the face vent 113 to reduce flow resistance and increase air volume.

Figure 9:
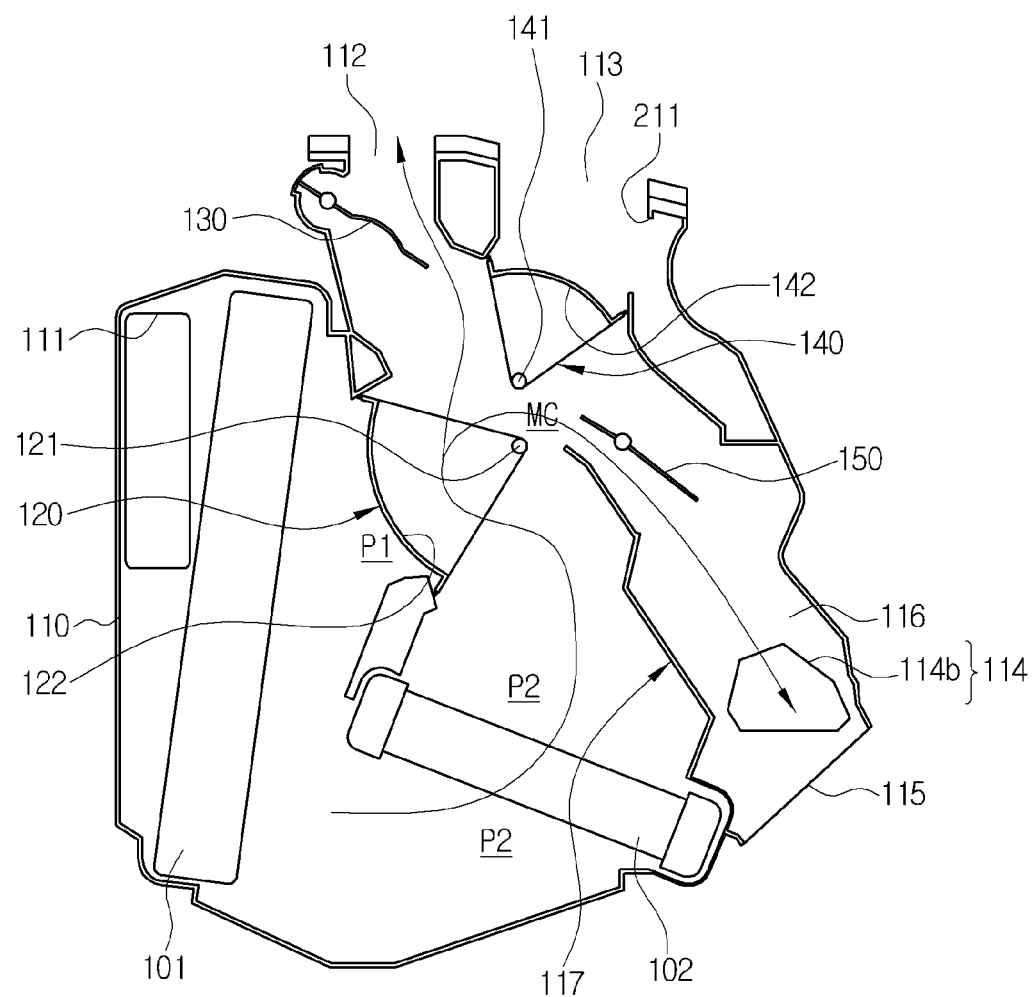
FIG. 9 is a sectional view showing the floor mode of the air conditioner for the vehicle according to the preferred embodiment of the present invention.
Figure 10:
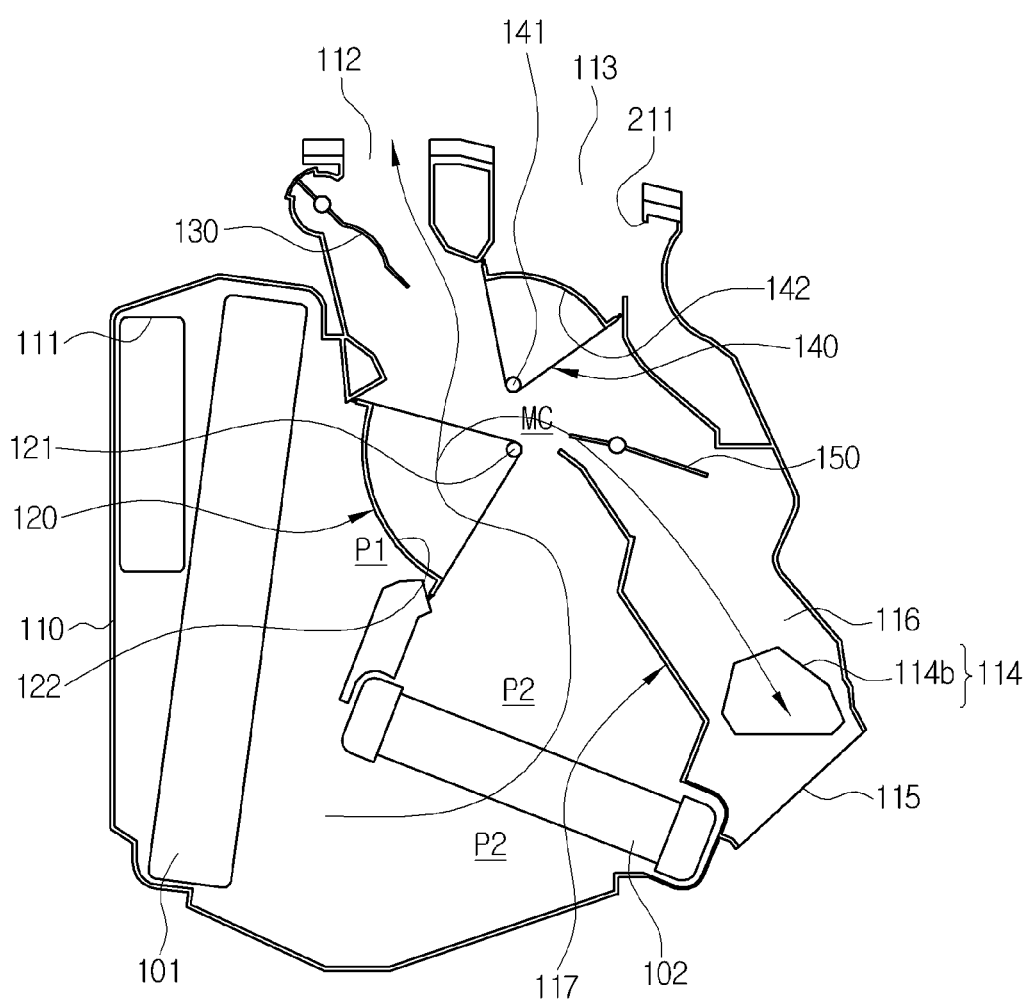
FIG. 10 is a sectional view showing a mixing mode of the air conditioner for the vehicle according to the preferred embodiment of the present invention.
Figure 11:
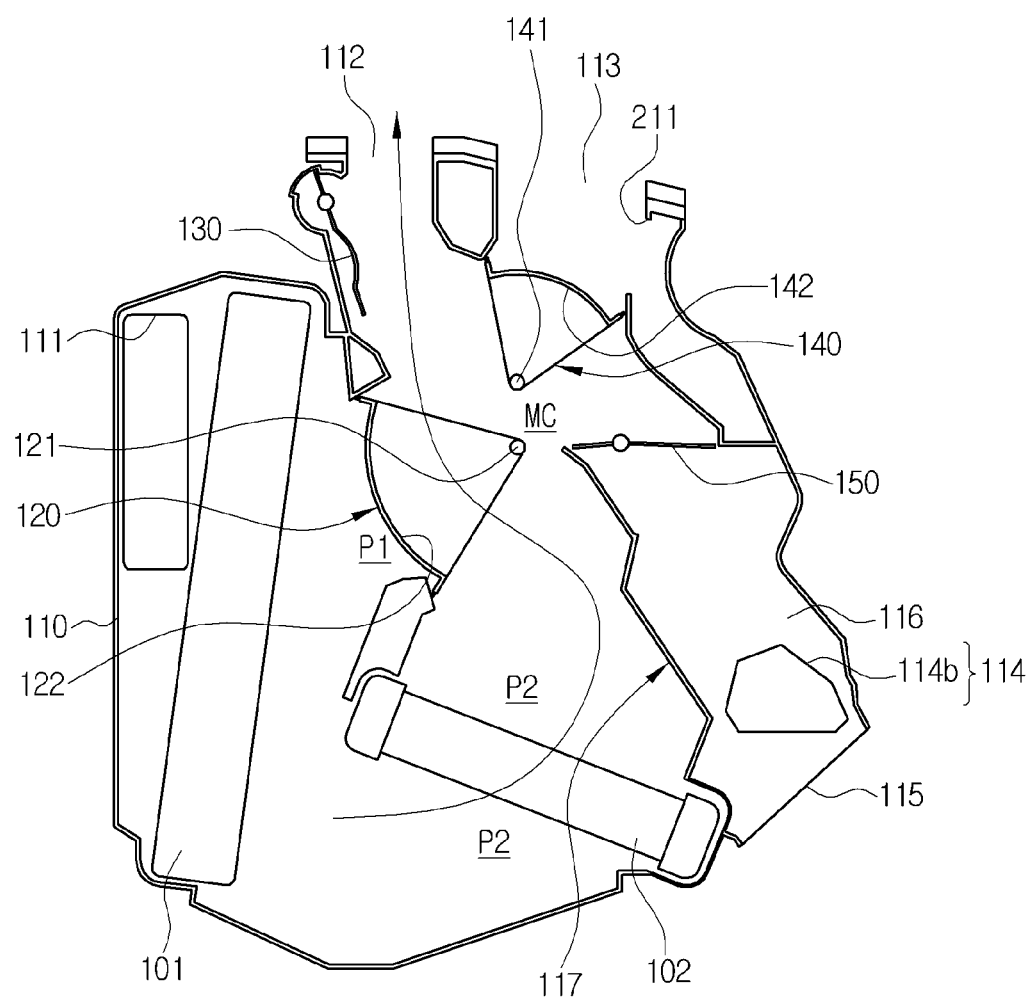
FIG. 11 is a sectional view showing a defrost mode of the air conditioner for the vehicle according to the preferred embodiment of the present invention.

In addition, in a floor mode shown in FIG. 9, a mixing mode shown in FIG. 10, and a defrost mode shown in FIG. 11, the curved surface 122 of the temperature-adjusting door 120 guides the air of the mixing chamber MC passing through the heater core 102 to the defrost vent 112 and the floor vents 114 and 115 to reduced flow resistance and increase air volume.

In this instance, the curved surface 142 of the face door 140 guide the air of the mixing chamber MC toward the defrost vent 112 and the floor vents 114 and 115 to reduce flow resistance and increase air volume.

Moreover, the face door 140 is mounted such that the rotational direction of the face door 140 is deviated from the flow direction of the air flowing toward the face vent 113.

That is, when the rotational direction of the dome-type face door 140 is deviated from the flow direction of the air flowing toward the face vent 113, because the face door 140 acts in the rotational direction but the air flowing toward the face vent 113 acts at right angles to the curved surface 142 of the face door 140, the rotational direction of the face door 140 gets different from the air flow direction so as to reduce actuating force of the face door 140.

When the actuating force of the face door 140 is reduced, it reduces load of an actuator actuating the face door 140 so as to improve durability.

Furthermore, the floor door 150 is a center pivot type door, which has plates at both sides around the rotary shaft, out of the flat type doors. The plate located near to the mixing chamber MC, out of the plates disposed at both sides of the rotary shaft of the floor door 150, is shorter than the other plate, such that the floor door 150 smoothly guides the air flowing toward the floor vents 114 and 115 and does not apply flow resistance against the air flowing toward the face vent 113 or the defrost vent 112.

In the meantime, a driving means (not shown) is mounted on the outer face of the air-conditioning case 110 in order to actuate the temperature-adjusting door 120 and the mode doors 130, 140 and 150.

Additionally, a console passageway 250 for supplying air inside the air-conditioning case 110 to the rear seat of the vehicle is disposed in the air-conditioning case 110.

In addition, a console duct 200 in which the console passageway 250 is formed is inserted and mounted between the left and right floor passageways 116a and 116b of the air-conditioning case 110.

In other words, the console duct 200 is inserted and mounted into the air-conditioning case 110, such that the console passageway 250 is formed to be hollowed in the inward direction of the air-conditioning case 110 and is arranged between the left and right floor passageways 116a and 116b.

In this instance, the console passageway 250 of the console duct 200 is formed on the same layer as the left and right floor passageways 116a and 116b. In other words, when viewed from the side of the air-conditioning case 110, the console passageway 250 is formed on the same layer, namely, is formed collinearly with the left and right floor passageways 116a and 116b.

In more detail, as shown in the drawings, a lower section of the console passageway 250 of the console duct 200 is formed on the same layer as the left and right floor passageways 116a and 116b, and an upper section of the console passageway 250 is formed on a different layer from the left and right floor passageways 116a and 116b.

Referring to the drawings, the lower section of the console passageway 250 is formed on the same layer as the left and right floor passageways 116a and 116b, but the upper section of the console passageway 250 is formed on a different layer at the rear side on the basis of the left and right floor passageways 116a and 116b.

Here, that the upper section of the console passageway 250 is formed on the different layer from the left and right floor passageways 116a and 116b means that the upper section is formed at the rear side of the left and right floor passageways 116a and 116b in the back-and-forth direction of the vehicle.

Meanwhile, the console duct 200 is assembled between the left case 110a and the right case 110b of the air-conditioning case 110. That is, a space where the console duct 200 is inserted is formed between the left case 110a and the right case 110b, namely, between the left and right floor passageways 116a and 116b, to be hollowed, and the console duct 200 is inserted and assembled in the hollow space.

As described above, the console duct 200 is inserted and mounted between the left and right floor passageways 116a and 116b of the air-conditioning case 110, such that the console passageway 250 is hollowed in the inward direction of the air-conditioning case 110. Accordingly, the console passageway 250 is formed on the same layer as the left and right floor passageways 116a and 116b to reduce the backand-forth size of the air-conditioning case 110 and reduce weight and manufacturing price of the air conditioner for the vehicle.

Furthermore, the rear side of the console duct 200 is formed to be open, and a duct cover 230 is detachably attached to the opened rear side of the console duct 200.

In more detail, the console duct 200 includes: a front part 210 formed at the front of the console passageway 250 to partition the console passageway 250 from the air passageway of the air-conditioning case 110; side parts 220 formed at both sides of the console passageway 250 to partition the console passageway 250 from the left and right floor passageways 116a and 116b; and a duct cover 230 detachably combined to the rear side of the console passageway 250.

In this instance, the lower section of the console duct 200 inserted into the air-conditioning case 110 gets in close contact with the partition wall 117. That is, a lower portion of the front part 210 of the console duct 200 gets in close contact with the partition wall 117.

Meanwhile, at a portion where the console duct 200 is mounted, the front part 210 of the console duct 200 may be a part of the partition wall 117. In this instance, the partition wall 117 and the front part 210 partition the console passageway 250 from the air passageway of the air-conditioning case 110.

The duct cover 230 is combined to the side parts 220 of the console duct 220 to close the open rear part of the console duct 200.

In the meantime, the console duct 200 further includes a communication part 211, which connects the face vent 113 with the console passageway 250 to supply the air flowing through the face vent 113 to the console passageway 250.

As described above, because the duct cover 230 is detachably combined to the rear side of the console duct 200, if the console passageway 250 is not needed, only the duct cover 230 is deleted and the left and right cases 110a and 110b are used in common. In this instance, when the duct cover 230 is deleted, it is preferable that the communication part 211 of the console duct 200 be closed by a separate cover (not shown).

Figure 4:
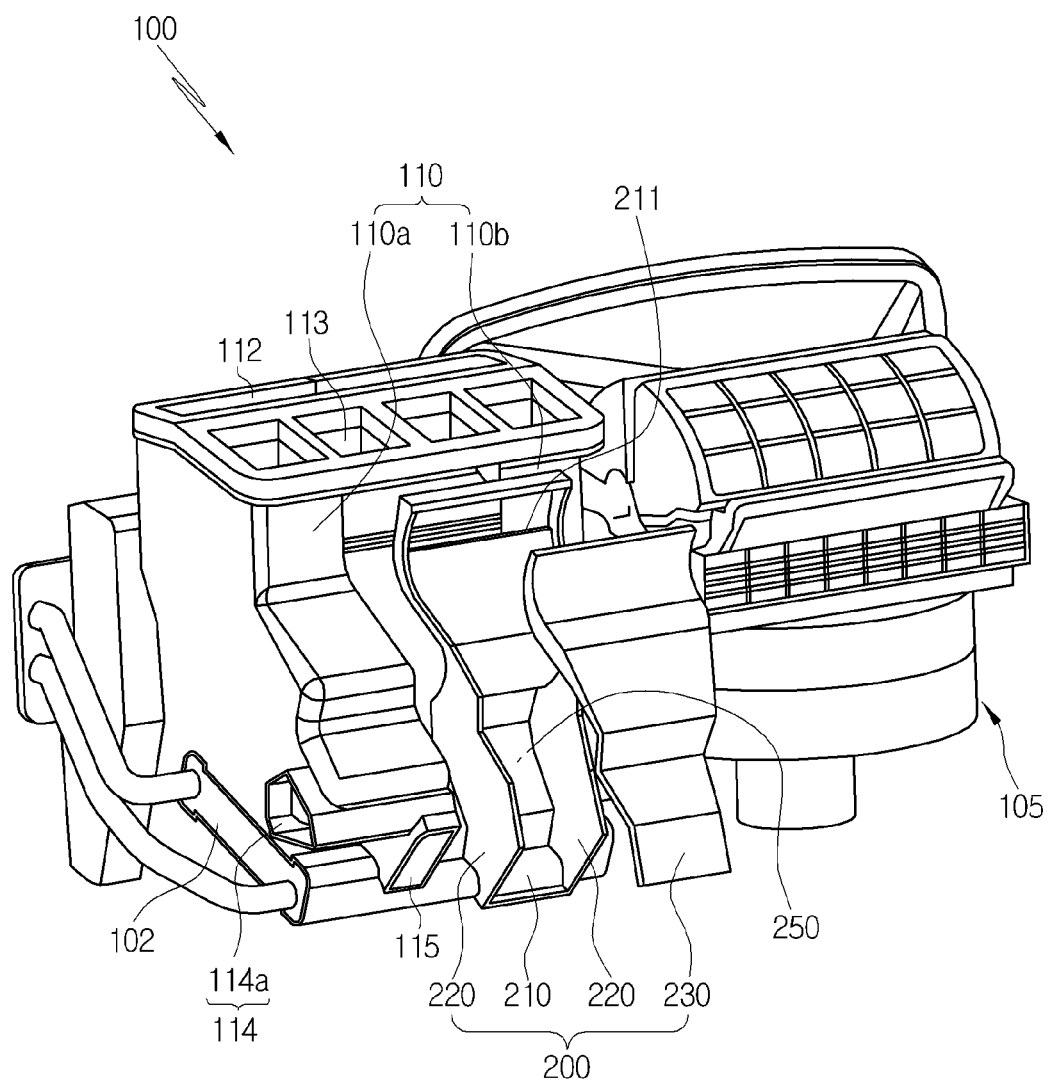
FIG. 4 is a perspective view showing a state where a console duct is separated from the air conditioner for the vehicle according to the preferred embodiment of the present invention.

Meanwhile, as shown in FIGS. 3 and 4, the console duct 200 is formed in such a way that an upper width of the console duct 200 is larger than a lower width. That is, the console duct 200 is formed such that the width gets gradually less from the upper part toward the lower part.

Here, the width of the console duct 200 means a width direction of the vehicle (in the direction from driver's seat to passenger's seat).

Hereinafter, the air discharge modes of the air conditioner for the vehicle according to the preferred embodiment of the present invention will be described.

A. Vent Mode (FIG. 7)

As shown in FIG. 7, in the vent mode of the greatest heating mode, the temperature-adjusting door 120 opens the cold air passageway P1 and closes the warm air passageway P2. The face door 140 opens the face vent 113, and the defrost door 130 and the floor door 150 respectively close the defrost vent 112 and the floor vents 114 and 115.

Therefore, the air blown by an air blower (not shown) is converted into cold air while passing through the evaporator 101, and then, is supplied to the face vent 113 after passing the mixing chamber MC. In this instance, some of the air supplied to the face vent 113 is discharged toward the face of the passenger sitting on the front seat, and some of the air is supplied to the console duct 200 through the communication part 211, and then, is discharged toward the face of the passenger sitting on the rear seat. (In the drawing, the dotted line indicates the console passageway 250 inside the console duct 200)

B. Bi-Level Mode (FIG. 8)

Figure 8:
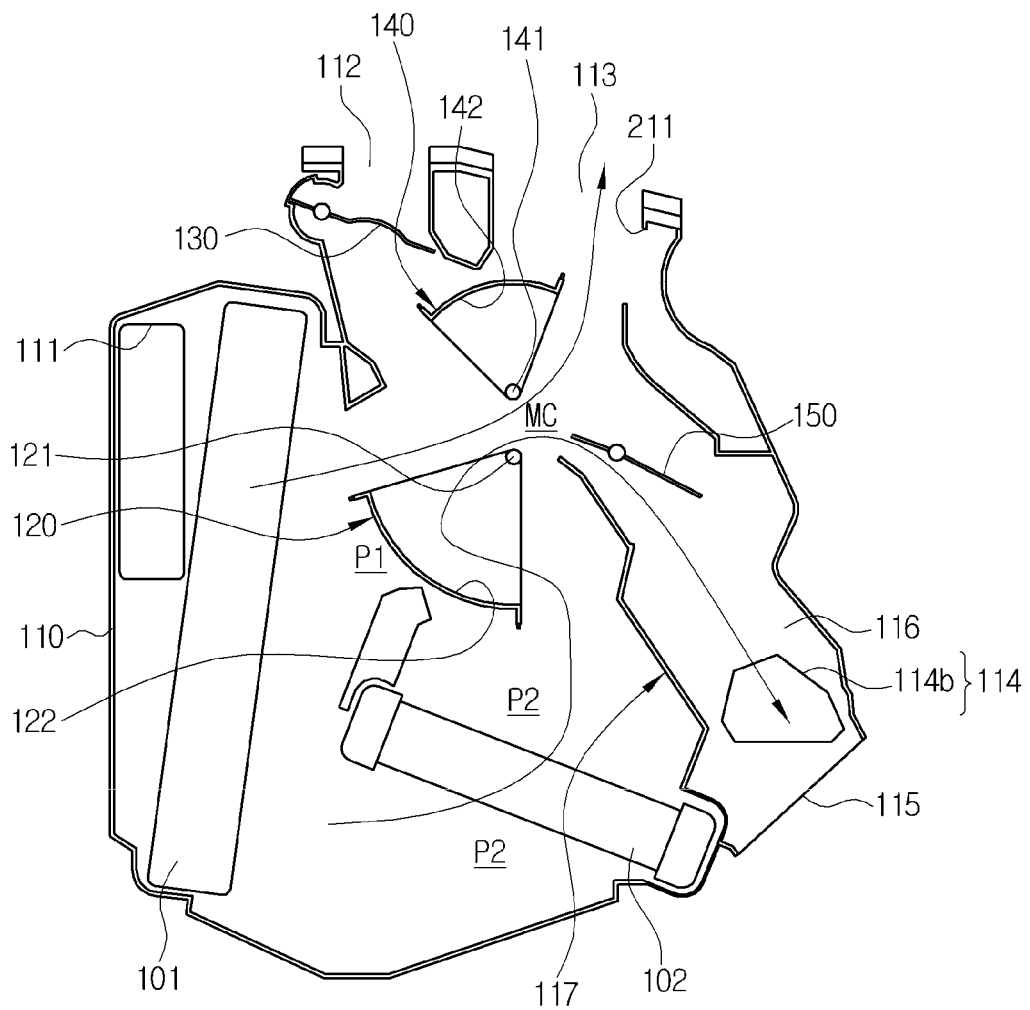
FIG. 8 is a sectional view showing a bi-level mode of the air conditioner for the vehicle according to the preferred embodiment of the present invention.

As shown in FIG. 8, in the bi-level mode, the temperature-adjusting door 120 opens the cold air passageway P1 and the warm air passageway P2, the face door opens the face vent 113, the defrost door 130 closes the defrost vent 112, and the floor door 150 opens the floor vents 114 and 115.

Therefore, the air blown by the air blower (not shown) is converted into cold air while passing through the evaporator 101. After that, some of the converted air directly flows to the mixing chamber MC, and some of the air is converted into warm air while passing through the heater core 102, and then flows to the mixing chamber MC.

The cold air and the warm air flowing to the mixing chamber MC are mixed together. Some of the mixed air is supplied to the face vent 113 to be discharged toward the face of the passenger sitting on the front seat, and some of the mixed air is supplied to the floor vents 114 and 115 to be discharged toward the feet of the passenger sitting on the rear seat.

In this instance, some of the air supplied to the face vent 113 may be discharged toward the face of the passenger sitting on the rear seat through the console duct 200.

C. Floor Mode (FIG. 9)

As shown in FIG. 9, in the floor mode, the temperature-adjusting door 120 closes the cold air passageway P1 and opens the warm air passageway P2, the floor door 150 opens the floor vents 114 and 115 to the maximum, the defrost door 130 and the face door 140 closes the defrost vent 112 and the face vent 113. In this instance, the defrost vent 112 is not completely closed but is slightly opened.

Therefore, the air blown by the air blower (not shown) is converted into warm air while passing through the heater core 102 after passing the evaporator 101, and then, passes the mixing chamber MC. Most of the warm air is supplied to the floor vents 114 and 115. In this instance, some of the air supplied to the floor vents 114 and 115 is discharged toward the feet of the passenger sitting on the front seat, and some of the air is discharged toward the feet of the passenger sitting on the rear seat.

Moreover, because the defrost vent 112 is opened slightly, a little air is discharged to the defrost vent 112.

In the floor mode, because the face vent 113 is closed by the face door 140, the console passageway 250 is also closed.

D. Mixing Mode (FIG. 10)

As shown in FIG. 10, in the greatest mixing mode, the temperature-adjusting door 120 closes the cold air passageway P1 and opens the warm air passageway P2, the floor door 150 opens the floor vents 114 and 115 to some degree, the defrost door 130 opens the defrost vent 112 to some degree, and the face door 140 closes the face vent 113.

Therefore, the air blown by the air blower (not shown) is converted into warm air while passing through the heater core 102 after passing the evaporator 101, and then, passes the mixing chamber MC. Some of the warm air is supplied to the floor vents 114 and 115 to be discharged toward the feet of the passengers sitting on the front seat and the rear seat, and some of the warm air is supplied to the defrost vent 112 to be discharged toward the window of the vehicle.

In the mixing mode, because the face vent 113 is closed by the face door 140, the console passageway 250 is also closed.

E. Defrost Mode (FIG. 11)

As shown in FIG. 11, in the defrost mode of the greatest heating mode, the temperature-adjusting door 120 closes the cold air passageway P1 and opens the warm air passageway P2, the defrost door 130 opens the defrost vent 112 to the maximum, the face door 140 closes the face vent 113, and the floor door 150 closes the floor vents 114 and 115.

The air blown by the air blower (not shown) is converted into warm air while passing through the heater core 102 after passing the evaporator 101, and then, passes the mixing chamber MC. After that, the warm air is supplied to the defrost vent 112 to be discharged toward the window of the vehicle.

In the defrost mode, because the face vent 113 is closed by the face door 140, the console passageway 250 is also closed.

F. All Mode (FIG. 12)

Figure 12:
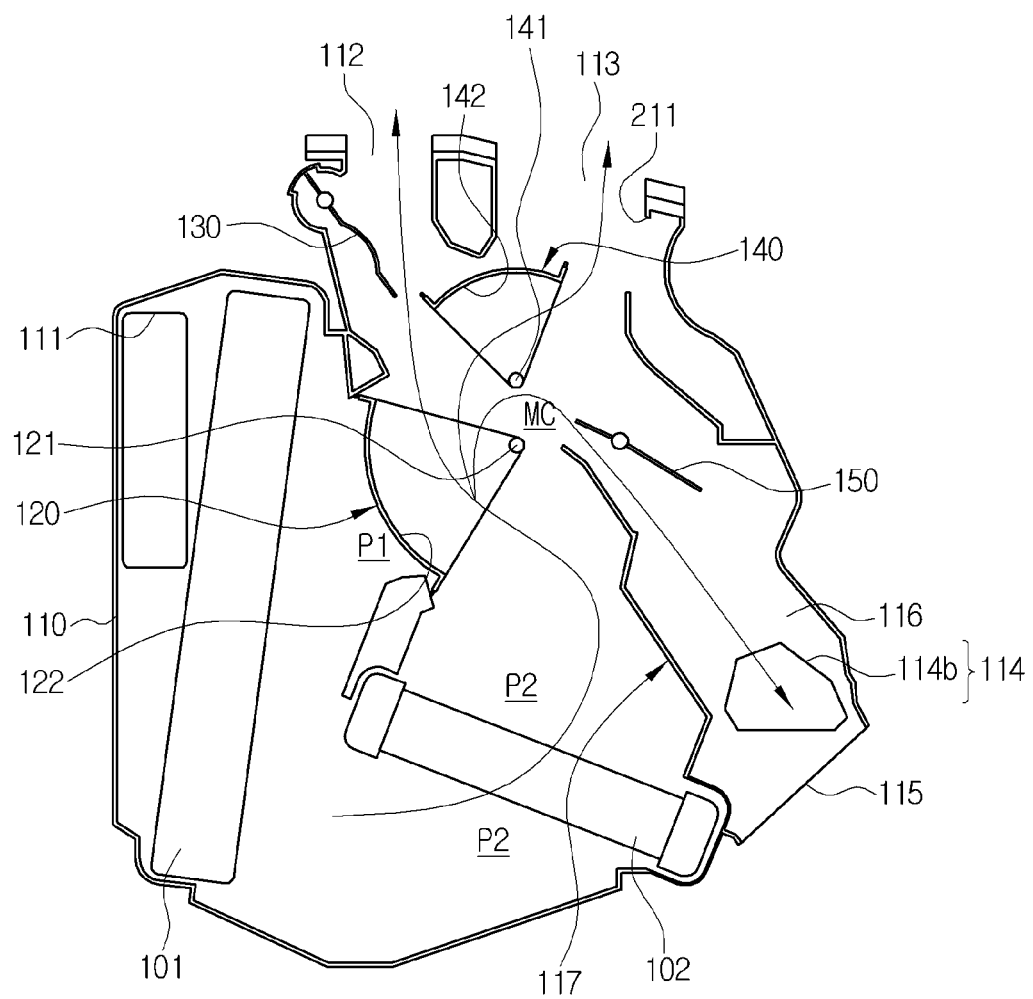
FIG. 12 is a sectional view showing an all mode of the air conditioner for the vehicle according to the preferred embodiment of the present invention.

As shown in FIG. 12, in the all mode of the greatest heating mode, the temperature-adjusting door 120 closes the cold air passageway P1 and opens the warm air passageway P2, the defrost door 130 opens the defrost vent 112 to some degree, the face door 140 opens the face vent 113 to some degree, and the floor door 150 opens the floor vents 114 and 115 to some degree.

That is, the defrost vent 112, the face vent 113 and the floor vents 114 and 115 are all opened.

Therefore, the air blown by the air blower (not shown) is converted into warm air while passing through the heater core 102 after passing the evaporator 101, and then, passes the mixing chamber MC. After that, the warm air is discharged to all of the defrost vent 112, the face vent 113 and the floor vents 114 and 115.

In the all mode, because the face vent 113 is closed by the face door 140, air can be discharged toward the rear seat through the console passageway 250.

Figure 13:
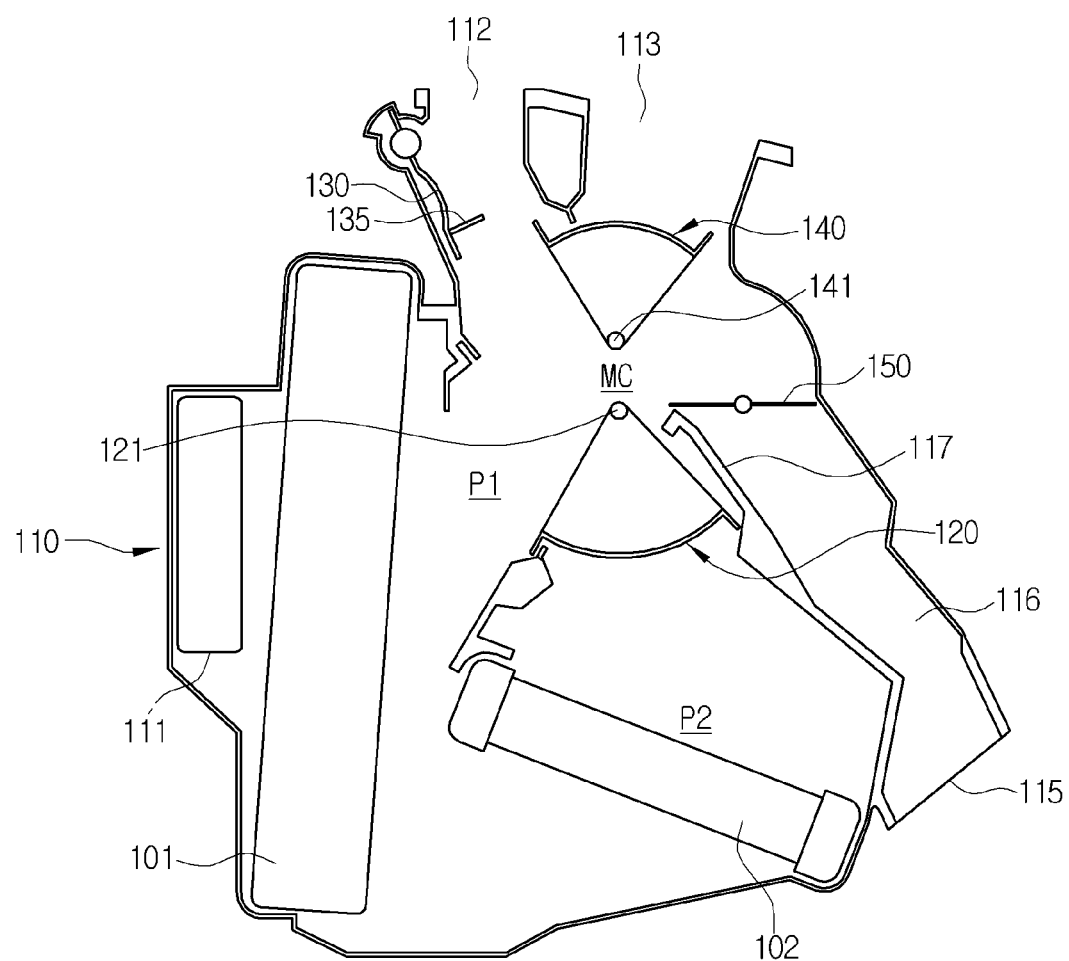
FIG. 13 is a sectional view showing an air conditioner for a vehicle according to a modification of FIG. 3.

In the meantime, FIG. 13 is a sectional view showing an air conditioner for a vehicle according to a modification of the present invention.

Referring to FIG. 13, the air conditioner for the vehicle according to the modification of the present invention includes: an air-conditioning case 110 having an air inflow port 111 formed on one side thereof, a plurality of air outflow ports formed on the other side, and an cold air passageway P1 and a warm air passageway P2 formed in an air passageway formed therein; an evaporator 101 and a heater core 102 spaced apart from each other at a predetermined interval in the air passageway inside the air-conditioning case 110; and a temperature-adjusting door 120 mounted between the evaporator 101 and the heater core 102 for adjusting the degree of opening of the cold air passageway P1, which bypasses the heater core 102, and the degree of opening of the warm air passageway P2, which passes through the heater core 102.

Furthermore, the plural air outflow ports formed at an outlet of the air-conditioning case 110 are a defrost vent 112, a face vent 113, and a floor vent 115. The defrost vent 112, the face vent 113 and the floor vents 114 and 15 are respectively opened and closed by a defrost door 130, a face door 140 and a floor door 150, which are mode doors mounted at the corresponding vents, in order to adjust the degree of opening of the doors.

Here, the defrost door 130 and the floor door 150 are flat-type doors. In this instance, the floor door 150 is a center pivot type door, which has plates at both sides around a rotary shaft, out of the flat type doors. Moreover, the temperature-adjusting door 120 and the face door 140 are dome-type doors which are mounted in the mixing chamber MC to rotate on rotary shafts 121 and 141. Because the temperature-adjusting door 120 and the face door 140 have the same structures as the previous embodiment, their detailed descriptions will be omitted.

The air conditioner according to the modification of the present invention does not have the console duct 200 provided in the previous embodiment. A baffle 135 protrudes on one side of the defrost door 130. The baffle 135 is formed to extend in a direction to close the defrost vent 112 from a flat portion of the defrost door 130. That is, the baffle 135 extends vertically from one side of the flat portion of the defrost door 130.

The baffle 135 partially closes the defrost vent 112 to serve as a resistor of air, and partially guides air to other vents except the defrost vent 112 to adjust wind distribution. Additionally, the baffle 135 protrudingly extends in the rotational direction, which is the direction to close the defrost vent 112, such that the air presses the defrost door 130 in the rotational direction so as to reduce the door actuating force.

In addition, an extension line of the partition wall 117 for partitioning the warm air passageway P2 and the floor passageway 116 is located collinearly with an inlet of the defrost vent 112. Therefore, the air passing through the warm air passageway P2 is guided toward the defrost vent 112 to secure air volume.

As described above, while the present invention has been particularly shown and described with reference to the example embodiments that the structure having the dome-type temperature-adjusting door and the dome-type face door mounted in the mixing chamber of the air-conditioning case is applied to the semi-center type air conditioner, it will be understood by those of ordinary skill in the art that the present invention is not limited to the example embodiments above embodiments and can be applied to all kinds of air conditioners, such as semi-center type air conditioners, center-mounting type air conditioners, and three-piece type air conditioners to obtain the same effect.

The invention claimed is:

1. An air conditioner for a vehicle comprising:
    an air-conditioning case having a defrost vent, a face vent, and floor vents to discharge air to the interior of the vehicle, and a cold air passageway and a warm air passageway formed therein;
    an evaporator located in the cold air passageway;
    a defrost door for adjusting a degree of opening of the defrost vent, a face door for adjusting a degree of opening of the face vent, and a floor door for adjusting a degree of opening of the floor vents, the defrost door, the face door and the floor door being mounted inside the air-conditioning case; and
    a temperature-adjusting door mounted inside the air-conditioning case to adjust a degree of opening of the cold air passageway and the warm air passageway,
    wherein the temperature-adjusting door is rotatably mounted in a mixing chamber formed at an exit of the cold air passageway and at an exit of the warm air passageway, wherein cold air and hot air from the cold and warm air passageways are mixed in the mixing chamber, and wherein the temperature adjusting door is a dome-type door for adjusting degree of opening of the cold air passageway and the warm air passageway relative to the mixing chamber,
    wherein the face door is rotatably mounted in the mixing chamber and is a dome-type door for adjusting the degree of opening of the face vent relative to the mixing chamber, wherein the face door is configured to close the defrost vent in a vent mode, wherein the temperature-adjusting door and the face door are mounted in the mixing chamber in opposite directions, wherein a rotary shaft of the temperature-adjusting door and a rotary shaft of the face door are arranged collinearly in a vertical direction, wherein the temperature-adjusting door and the face door each have a first end portion located closest to the evaporator and a second end portion spaced from the first end portion, wherein an interval between the first end portions of the temperature-adjusting door and the face door is A, an interval between the second end portions of the temperature-adjusting door and the face door is B, and A is smaller than B in all air discharge modes.

2. The air conditioner according to claim 1, wherein the temperature-adjusting door has a curved surface formed on an inner face thereof to guide an air flow.

3. The air conditioner according to claim 1, wherein the face door has a curved surface formed on an inner face thereof to guide an air flow.

4. The air conditioner according to claim 1, wherein the face door is mounted such that a rotational direction of the face door is deviated from a flow direction of the air flowing toward the face vent.

5. The air conditioner according to claim 1, wherein the floor door is a center-pivot type door having a first plate and a second plate disposed on opposing sides of a rotary shaft, and wherein the first plate is located closer to the mixing chamber than the second plate, and wherein the first plate is shorter than the second plate.

6. The air conditioner according to claim 1, wherein the evaporator is arranged such that the air introduced into the cold air passageway passes through the evaporator in a horizontal direction being perpendicular to the vertical direction, and wherein a heater core is arranged such that the air introduced into the warm air passageway passes through the heater core in the vertical direction.

7. The air conditioner according to claim 1, wherein a baffle is protrudingly formed on one side of the defrost door.

8. The air conditioner according to claim 7, wherein the defrost door is a flat type door, and the baffle extends from a flat part of the defrost door in the direction to close the defrost vent.

9. The air conditioner according to claim 1, wherein an extension line of a partition wall for partitioning the warm air passageway and the floor passageway from each other is located collinearly with an inlet of the defrost vent.

* * * * *